United States Patent [19]
Rougnon-Glasson

[11] Patent Number: 6,098,496
[45] Date of Patent: Aug. 8, 2000

[54] CONTROL DEVICE FOR AN AUTOMOBILE VEHICLE SEAT ADJUSTMENT ELEMENT

[75] Inventor: Olivier Rougnon-Glasson, Saires-la-Verrerie, France

[73] Assignee: Bertrand Faure Equipements S.A., Boulogne Cedex, France

[21] Appl. No.: 09/200,933

[22] Filed: Nov. 30, 1998

[30] Foreign Application Priority Data

Nov. 28, 1997 [FR] France ................................ 97 15190

[51] Int. Cl.⁷ .............................. B60N 2/22; G05G 5/24; F16B 7/04
[52] U.S. Cl. ................................ 74/586; 74/527; 24/543; 188/67; 297/362.12; 403/291; 403/348; 403/373
[58] Field of Search .................. 74/527, 586; 24/30.5 P, 24/543; 188/67; 297/362.12; 403/291, 326, 348, 373

[56] References Cited

U.S. PATENT DOCUMENTS

| 2,846,896 | 8/1958 | Allen ........................................ 74/495 |
| 3,126,191 | 3/1964 | Holden ..................................... 248/286 |
| 4,386,752 | 6/1983 | Pavlak et al. ............................. 248/73 |
| 4,925,212 | 5/1990 | Motozawa . |
| 4,932,722 | 6/1990 | Motozawa . |
| 5,226,892 | 7/1993 | Boswell .................................. 604/180 |
| 5,367,750 | 11/1994 | Ward ..................................... 24/16 PB |
| 5,660,444 | 8/1997 | Thomas . |

FOREIGN PATENT DOCUMENTS

| 2650234 | 2/1991 | France . |
| 40 22 571 | 2/1991 | Germany . |
| 40 32 157 | 7/1991 | Germany . |
| 4-201651 | 7/1992 | Japan . |
| 6-024262 | 2/1994 | Japan . |

Primary Examiner—Allan D. Herrmann
Attorney, Agent, or Firm—Pollock, Vande Sande & Amernick

[57] ABSTRACT

A control device for an automobile vehicle seat adjustment element including a control element connected to the adjustment element by a connecting rod. The rod is attached to one of the elements by a clamp made of a material more deformable than the material of the rod, the claim including a body and a cover between which the rod is inserted, the rod including protuberances which anchor into the material of the clamp by deforming this material.

9 Claims, 3 Drawing Sheets

CONTROL DEVICE FOR AN AUTOMOBILE VEHICLE SEAT ADJUSTMENT ELEMENT

FIELD OF THE INVENTION

This invention concerns a control device for an automobile vehicle seat adjustment element of the type including a control element connected to the adjustment element by a connecting rod.

BACKGROUND OF THE INVENTION

Such devices are especially used to make offset controls for various automobile seat adjustment mechanisms, for example, to control the position locking of the articulation mechanism of the backrest with respect to the seat pan by means of a control handle located on the side of the seat pan, offset towards the front of the seat in relation to the said articulation.

Such a known device is shown on FIG. 1, where an articulation mechanism 1 can be seen, installed between the framework of the seat pan 2 and the framework of the backrest 3 and including a link 4 enabling the mechanism to be unlocked in a manner known in the art. The pivoting of this unlocking link is controlled by a control element located on the side of the seat pan framework and connected to the unlocking link 4 by a connecting rod 6. The connecting rod 6 is held onto the link 4 by an attaching part such as, for example, a clip 7 also of a known type. This clip determines the position of the rod 6 in relation to the unlocking link 4 while authorizing their relative pivoting. The connection between the rod and the control element 5 is ensured by a pin 8 attached to a link 9 of the said control element. The rod 6 passes through a diametral hole in the pin and the positioning of the rod in relation to the control link 9 is ensured by translation locking means, such as a locking washer 10, preventing the rod from sliding in the said pin. In direction only, blocking in the other direction not being required as the articulation mechanism includes elastic return means for the unlocking link 4 and the control element only needs to pull on the rod to control unlocking.

The relative positioning of the unlocking link 4 and the control link 9 is determined therefore by the effective length of the rod and, therefore, by the position of the washer 10 on the rod. This positioning must ensure that the control rod 9 bears on and cannot rotate in relation to the housing 11 of the control element 5 when the locking link is in its mechanism 1 locking position, this especially to avoid play in the control link and any noise which may result.

On account of the dispersions which can exist between various seats concerning the distance between the articulation mechanism and the control element 5, it is necessary, when installing such a device on a seat, to adjust the effective length of the rod and therefore to adjust the position of the washer on the rod. Also, during later use of the seat, there is a risk that the washer may slide on the rod under the tensile loads exerted on the rod by the unlocking link with the appearance of play between the pin and the washer. consequently, when the washer comes too far from the pin, the unlocking link will no longer control the articulation mechanism.

To avoid these problems, it would be possible to adjust and maintain the position of the rod in relation to the pin 8 by a nut screwed onto a thread made on the rod. Such a solution has the disadvantage of being more costly, increasing the device installation time and is also liable to misadjustment if the nut is not secured in rotation.

Whatever the case, these systems also have the disadvantage of requiring, during installation, the insertion of the rod into the pin along the axial direction of the rod which may complicate the installation due to the limited rotational travel of the links 4 and 9.

Similar problems may arise in all cases where a connection is required between a rod and an element controlling the movement of this rod with accurate relative positioning.

BRIEF DESCRIPTION OF THE INVENTION

The purpose of this invention is to solve these problems and aims in particular in facilitating rapid assembly of a rod on a link or another similar control element while enabling an accurate and reliable adjustment of their relative positions. It also aims in providing a low-cost system as concerns the parts required and the installation time.

With these targets in mind, the subject of the invention is a control device for an automobile vehicle seat adjustment element including a control element connected to an adjustment element by a connecting rod, this device being characterized in that the rod is fixed to one of the said elements by a clamp made of a material more deformable than the material of the rod, the clamp including a body and a cover between which the rod is inserted and the said rod including protuberances which anchor into the material of the clamp by deforming this material.

Before installation, the location of the rod in the clamp is defined by a bore with a section more or less equal to that of the rod made at the interface between clamp body and cover, for example in the form of two half-cylindrical grooves made respectively in the body bore when the cover is assembled on the body.

The connection, in rod axial direction, between the rod and the clamp is obtained thanks to the penetration of the protuberances of the rod into the softer material of the clamp made, for example, of a plastic material whereas the rod is made of a metal, especially steel. The anchoring of the protuberances in the clamp can be achieved in any position along the axial direction. Therefore, the positional adjustment during the installation of the rod automatically and accurately results from the relative positions of the rod and the clamp before the rod is inserted between the clamp body and cover and, therefore, no specific adjustment operations are required. Also, this positioning is definitively ensured as soon as the protuberances have made their indentations in the clamp.

Preferably, the body and the cover are made of one piece, the cover being connected to the body by a deformable area forming an articulation with an axis parallel to the axis of the rod and including locking means more or less diametrically opposite the deformable area in relation to the rod, to lock the cover onto the body. Making the clamp from a plastic material facilitates the forming of the said deformable area in the form of a thinner portion comprising a flexible hinge between the body and the cover. During installation, it is sufficient to place the rod in the groove of the body, then to fold down the cover and press it onto the body until it locks, for example by means of simple pliers. Another advantage is that the rod is brought into position against the clamp body along a direction perpendicular to the rod axis and that an eventually limited movement of the parts connected by the rod is no longer liable to hinder installation.

The protuberances on the rod can be made in different forms such as, for example, in the form of circumferential ribs or any other form suitable to penetrate into the material of the clamp. Preferably, however, the rod includes two rows of protuberances, made in diametrically opposite areas and anchoring respectively in the body and in the cover, these protuberances consisting, for example, of studs formed by stamping the rod.

Again preferably, to facilitate the clamp deformation caused by these protuberances, holes are made in the body and the cover of the clamp, parallel to the axis of the rod, in a manner so that they will be in front of the rows of protuberances.

According to other specific arrangements:

the cover locking means consist of a deformable lip made on the cover and forming a hook which grips onto the edge of the body the element onto which the clamp is fixed is a pivoting link and the body of the clamp is installed so as to pivot on the said link by a bayonet-type assembly, formed by a journal with an axis perpendicular to the axis of the rod and including two diametrically opposite lugs adapted to hold the clamp onto the link after insertion into an opening of corresponding form made in the link and rotation of the clamp around the journal axis. This arrangement enables the clamp to be connected to the link in a very simple manner without attaching accessories or tooling, the clamp being held by the rod in the position obtained after the rotation of the clamp during installation.

Other characteristics and advantages will appear in the description which will be given of a preferred design of the invention applied to a device controlling the unlocking of an articulation mechanism of a backrest on the seat pan of an automobile seat.

DETAILED DESCRIPTION OF THE INVENTION

Figure 1:
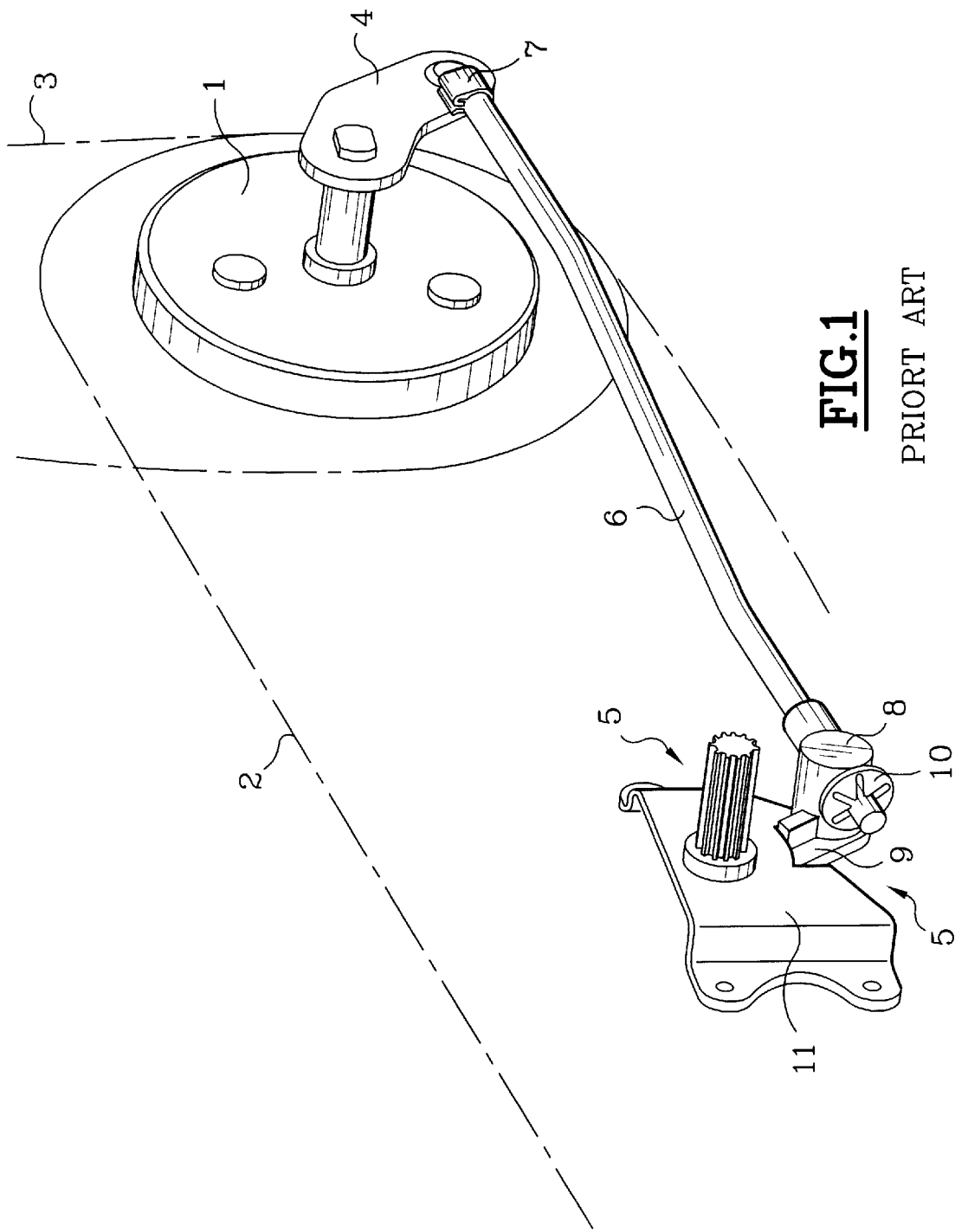
Figure 2:
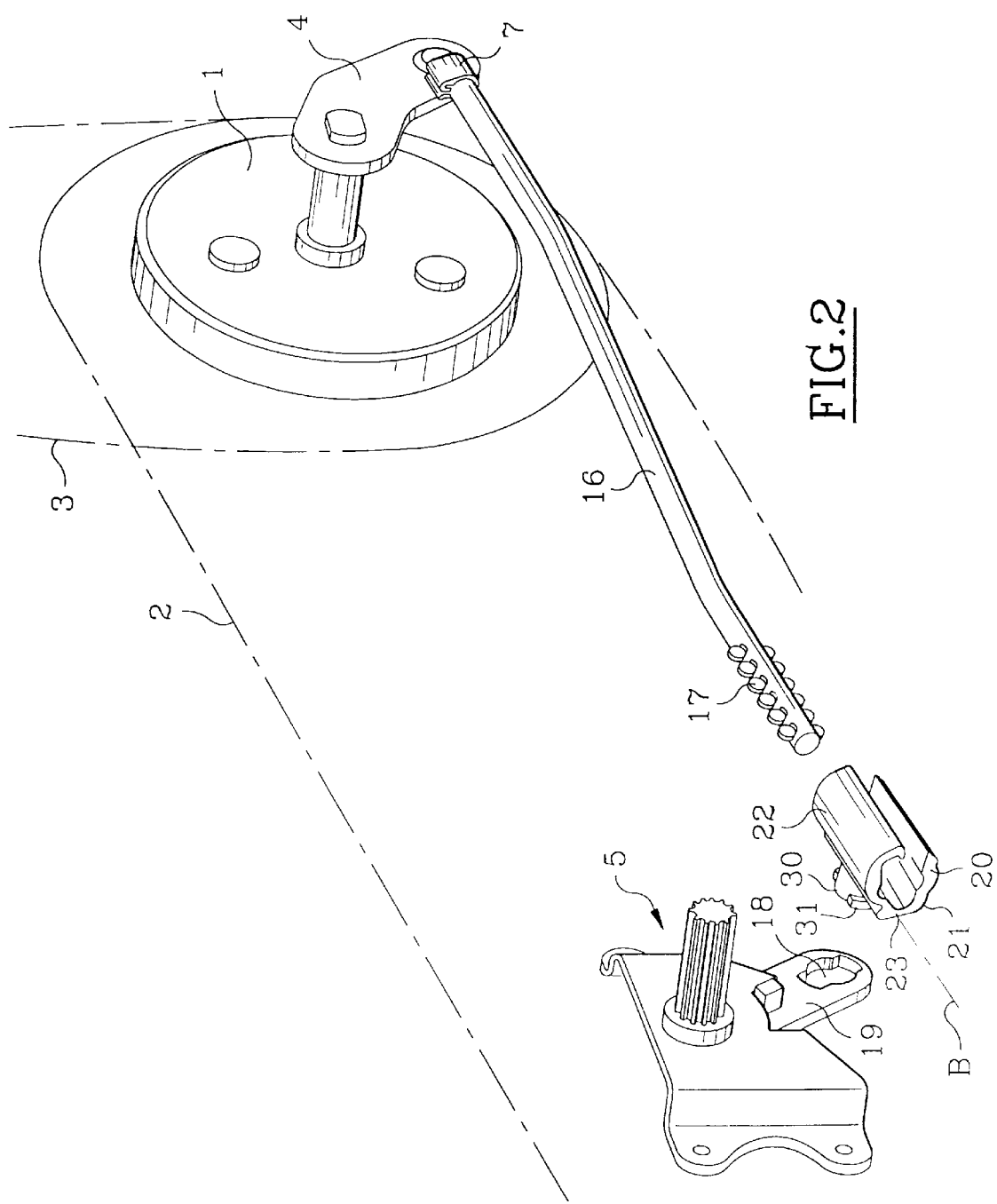
Figure 3:
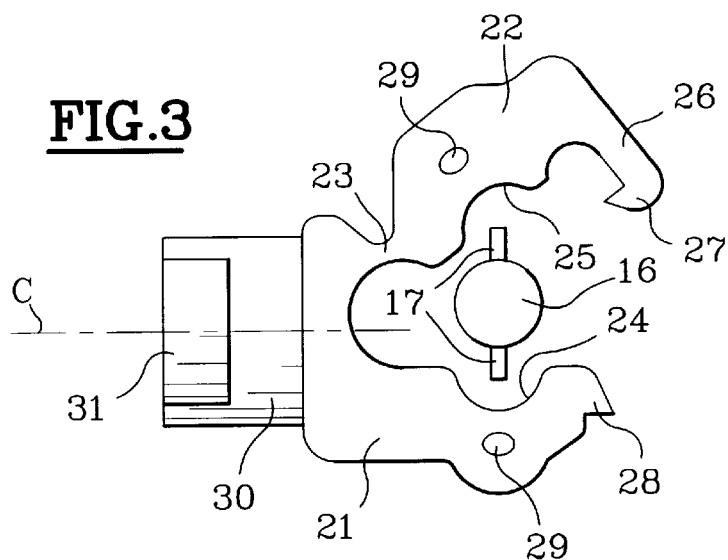
Figure 4:
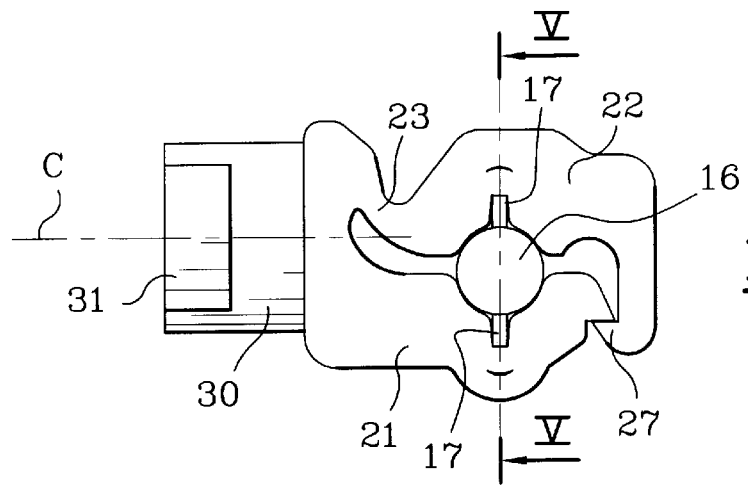
Figure 5:
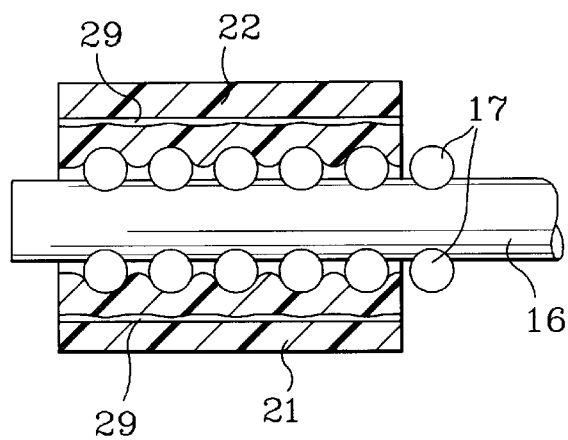

Refer to the appended drawings on which:

FIG. 1 shows a device of this type, according to the state of the art, and which was described at the beginning of this paper, FIG. 2 represents the device in compliance with the invention showing an exploded view of the connection of the rod on a control link, FIG. 3 shows a front view of the installation of the rod in the clamp, FIG. 4 is a corresponding view, after installation, FIG. 5 is a cross-sectional view through V—V of FIG. 4.

The drawing of FIG. 2 shows an automobile seat backrest tilting adjustment mechanism 1, this mechanism being placed between the seat pan framework 2 and the backrest framework 3 level with the hinge axis between the two frameworks. In a manner known itself, the inclination of the backrest is adjusted after having unlocked the mechanism 1, by controlling the pivoting of the link 4 which, for this purpose, is connected by the rod 16 to a link 19 of the control element 5 placed on the seat pan side.

The rod 16 is connected by a first end to the link 4 by a clip 7 of a type known by one skilled in the art, and to the link 19 by a clamp 20 made of a plastic material, including a body 21 and a cover 22, between the body are made of one piece and connected together by a thin area 23 deformable by bending and acting as a hinge between the body and the cover. The cover also includes a deformable lip 26 terminated by a hook 27 designed to grip onto an edge 28 of the body, more or less diametrically opposite the hinge 23 in relation to the rod.

The free end of the rod 16 includes two sets of protuberances such as the studs 17 shown on FIG. 5 made, for example, by stamping or punching along diametrically opposite generatrices.

Two half-cylindrical grooves 24, 25 are made respectively in the body and the cover so that they will grip the rod 16 when the cover is folded down and locked onto the body, as shown on FIG. 4, the cogs 17 penetrating into the material of the clamp 20, as shown on FIG. 5.

To facilitate the penetration of the notches or cogs of the rod in the clamp, holes 29 are made in the body and the cover at the level of grooves 24 and 25. As can be seen on FIG. 3, these substantially cylindrically-shaped holes 29, extend parallel to the grooves 24 and 25 along the axis of the rod so as to correspond with the cogs of the rod as shown on FIGS. 4 and 5.

The presence of the holes 29 locally reduces the thickness of the clamp at each groove, but also reduces the force required to close the cover onto the body of the clamp, the latter being then less susceptible to be damaged during installation.

As can be seen on FIG. 5, the securing of the free end of the rod 16 in position is ensured by a plastic deformation of the clamp when the cogs penetrate into the clamp, the softer material of the clamp being inserted into the hollows located between the cogs 17 of the rod. The anchoring thus achieved is then sufficiently strong to trans er the axial leads on the rod to the links 4 and 19.

The clamp is installed so as to pivot on the link 19 around an axis C perpendicular to rod direction consisting of a cylindrical journal 30 made on the body 21 of the clamp. To hold the clamp onto the link 19, a bayonet-type assembly is made. To achieve this, the journal includes two diametrically opposite lugs 31 which extend radially in relation to the axis B of the journal, from one end of the journal. Insertion of the clamp in the link is ensured by an opening 18 with a form corresponding to the journal equipped with lugs and the clamp is held onto the link by pivoting the said clamp, once inserted in the link 19, through substantially one quarter of a turn around axis B so as to place the lugs 31 of the journal transversally through the opening 18.

The invention is not limited to the design described above only as an example. In particular:

the shapes and arrangements of the protuberances or cogs made on the rod can be modified, the locking of the cover on the body of the clamp can also be modified together with means for attaching the body of the clamp on the link.

The invention is not limited to the use described only as an example. In particular, the invention can also apply to cases where a control device must be connected to an adjustment or locking element of an automobile vehicle seat using a rod, by means of clamps according to the invention. For example, for a seat including a backrest foldable onto the seat pan, a lever, located on one of the sides of the seat, could be connected to the articulation mechanism by a rod.

What is claimed is:

1. Control device for an automobile vehicle seat adjustment element comprising a control element connected to the adjustment element by a connecting rod wherein the rod is attached to one of the elements by a clamp made of a material more deformable than the material of the rod, the clamp including a body and a cover between which the rod is inserted and the rod including protuberances which anchor into the material of the clamp by deforming this material.

2. Device in accordance with claim 1, wherein the body and the cover are made of one piece, the cover being connected to the body by a deformable area forming an articulation with axis (B) parallel to the axis of the rod and including locking means, substantially diametrically opposite the deformable area in relation to the rod to lock the cover onto the body.

3. Device in accordance with claim 1, wherein the rod includes two sets of protuberances, made in diametrically opposite areas and anchoring into the body and the cover respectively.

4. Device in accordance with claim 1, wherein the protuberances consist of studs form by stamping the rod.

5. Device in accordance with claim 2, wherein the locking means includes a deformable lip made on the cover and forming a hook which grips onto an edge of the body.

6. Device in accordance with claim 3, wherein holes are made in the body and the cover, parallel to the axis of the rod to facilitate the deformation of the material of the clamp by the protuberances.

7. Device in accordance with claim 1, wherein the element onto which the clamp is fixed is a pivoting link and the body of the clamp is installed so as to pivot on the link by a bayonet-type assembly.

8. Device in accordance with claim 7, wherein, to form the bayonet-type assembly, the clamp body includes a journal with axis (C) and two diametrically opposite lugs adapted to hold the clamp onto the link after insertion into an opening of corresponding form made in the link and rotation of the clamp around said axis (C).

9. Device in accordance with claim 1, wherein the clamp is made of a plastic material.

* * * * *